United States Patent [19]

Seago et al.

[11] Patent Number: 5,801,830

[45] Date of Patent: Sep. 1, 1998

[54] APPARATUS AND ASSOCIATED METHODS OF DETECTING OPTICAL CARRIERS AND MEASURING CHARACTERISTICS THEREOF

[75] Inventors: James D. Seago, Plano, Tex.; John M. Hughes, Gladstone, Mo.

[73] Assignee: Wavelinq, Inc., Plano, Tex.

[21] Appl. No.: 601,171

[22] Filed: Feb. 14, 1996

[51] Int. Cl.⁶ .................................................. G01J 3/26
[52] U.S. Cl. ...................... 356/346; 356/73.1; 356/352
[58] Field of Search ............................ 356/73.1, 346

[56] References Cited

U.S. PATENT DOCUMENTS

| | | | |
|---|---|---|---|
| 4,829,596 | 5/1989 | Barina | 455/612 |
| 4,904,864 | 2/1990 | Dakin et al. | 250/227 |
| 4,942,568 | 7/1990 | Khoe et al. | 370/3 |
| 5,023,718 | 6/1991 | Soloff | 358/160 |
| 5,179,420 | 1/1993 | So et al. | 356/73.1 |
| 5,251,002 | 10/1993 | Gryk | 356/73.1 |
| 5,305,078 | 4/1994 | LaMonde | 356/73.1 |
| 5,323,224 | 6/1994 | Wada | 356/73.1 |
| 5,390,017 | 2/1995 | Ozeki et al. | 356/73.1 |
| 5,412,464 | 5/1995 | Thomas et al. | 356/73.1 |
| 5,453,826 | 9/1995 | Sugimoto et al. | 356/73.1 |

OTHER PUBLICATIONS

Carleton "Electronic stabilization of scanning interferometers" Applied Optics vol. 15 #4, Apr. 1976, pp. 929–933.
A page from an unidentified trade journal showing a device called the "Optical spectrum Analyzer".
Two pages from a data sheet published by Wandel & Golterman showing a device called the "Optical Spectral Analyzer".

*Primary Examiner*—Vincent P. McGraw
*Attorney, Agent, or Firm*—Konneker & Smith, P.C.

[57] ABSTRACT

Apparatus and associated methods of detecting optical carriers and measuring characteristics thereof provide optical carrier wavelength determination and measurement of other characteristics with improved precision. In a preferred embodiment, a method of detecting optical carrier wavelengths utilizes a controller to direct a stabilization circuit to adjust an optical filter to sample selected wavelength portions of an optical spectrum. The controller then evaluates the samples' intensities and directs the stabilization circuit to adjust the filter to sample other selected wavelength portions of the spectrum based upon the results of the evaluation.

20 Claims, 3 Drawing Sheets

APPARATUS AND ASSOCIATED METHODS OF DETECTING OPTICAL CARRIERS AND MEASURING CHARACTERISTICS THEREOF

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to optical data transmission and, in preferred embodiments thereof, more particularly provides apparatus and associated methods of identifying optical carriers and measuring characteristics thereof.

Multiplexed optical carriers have become commonplace in the art of optical data transmission. For example, recently developed wavelength division multiplexers (WDMs) permit deployment of networked fiber optic transmission systems which utilize multiple optical carriers transmitted via a single optical fiber. In order for an optical carrier to be useful for data transmission in such a multiplexed optical environment, it must have a particular wavelength associated therewith, it must have an acceptable intensity, and it must have an acceptable optical signal-to-noise ratio (OSNR).

In order to analyze the components of an optical transmission system or evaluate the effectiveness of changes made to the optical transmission system, it is necessary to collect certain data on the system. In the case of an optical data transmission system which transmits multiplexed optical carriers, it is beneficial to evaluate each optical carrier individually. When, however, optical carrier wavelengths drift, or when the precise wavelengths of the optical carriers are otherwise unknown, it is necessary to determine the wavelengths of the optical carriers before measuring their other characteristics.

After a precise wavelength has been determined for each optical carrier, certain other characteristics of the optical carrier, such as intensity and OSNR, may then be measured. It is, however, important that the precise wavelength, and not an approximate wavelength, for each optical carrier first be determined. Otherwise, it is not possible to accurately measure other characteristics of the optical carriers.

Optical spectrometers are well known in the art. One type of optical spectrometer includes grating-based monochromators which are placed in the optical signal path. Such spectrometers are sensitive to mechanical shock, vibration, temperature variations, etc., which make them difficult to maintain in calibration. They are also incapable of the precision of wavelength and OSNR measurement needed for modern multiplexed optical carriers.

Another type of optical spectrometer utilizes an etalon device to sample particular wavelengths of an optical carrier. An etalon device has a pair of flat parallel faces and a selectively variable air gap between the parallel faces. An optical spectrum is passed through the etalon device at a predetermined air gap to sample a corresponding wavelength of the optical spectrum. Characteristics of the sampled wavelength may then be measured.

Unfortunately, these etalon-type spectrometers are only useful if the precise wavelength of each of the optical carriers are known beforehand so that the spectrometer may be directed to sample the appropriate wavelengths. Otherwise, the spectrometer must be programmed to sample wavelengths at preset intervals along the optical spectrum, producing a rough approximation of the carriers in the optical spectrum.

Prior etalon-type spectrometers also suffer from inaccurate optical carrier intensity and OSNR measurements. In part, these inaccuracies are attributable to the imprecision in optical carrier wavelength determination discussed above. Additionally, prior etalon-type spectrometers have failed to compensate for contributions from other optical carriers in their measurements of characteristics of a particular optical carrier.

From the foregoing, it can be seen that it would be quite desirable to provide apparatus and associated methods of detecting optical carriers in an optical spectrum which does not require components relatively sensitive to factors such as mechanical shock, vibration, and temperature variations, and which does not require prior knowledge of the precise optical carrier wavelengths, but which precisely determines the wavelengths of the optical carriers and measures associated characteristics, such as intensities and optical signal-to-noise ratios. It would also be desirable to provide a method of correcting particular optical carrier characteristic measurements for contributions from other optical carriers. It is accordingly an object of the present invention to provide such apparatus and methods.

SUMMARY OF THE INVENTION

In carrying out the principles of the present invention, in accordance with an embodiment thereof, apparatus for detecting optical carriers and measuring characteristics of the optical carriers is provided which utilizes a feedback-controlled etalon device. In one method aspect of the present invention, optical carrier wavelengths are precisely determined. In other method aspects of the present invention, characteristics of the optical carriers are measured and the contributions from other optical carriers are compensated for in the measurements.

In broad terms, apparatus is provided for analyzing an optical signal having a path and a plurality of wavelength portions. The apparatus includes filter means, stabilizing and adjusting means, controlling means, and detecting means. The filter means is positionable in the path of the optical signal and is adjustable to permit first selected ones of the plurality of wavelength portions to pass therethrough.

The controlling means directs the stabilizing and adjusting means to adjust the filter means, such that the filter means permits the first selected ones of the plurality of wavelength portions to pass therethrough. The controlling means is also capable of directing the stabilizing and adjusting means, in response to the detecting means measuring the intensity of each of the first selected ones of the plurality of wavelength portions, to adjust the filter means to permit second selected ones of the plurality of wavelength portions to pass therethrough.

The detecting means is positionable in the path of the optical signal and is connected to the controlling means. It is capable of measuring an intensity of each of the first selected ones of the plurality of wavelength portions.

A method of measuring a first optical carrier having a wavelength of an optical spectrum is also provided. The method includes the steps of: (1) providing a filter capable of sampling selected portions of the optical spectrum at corresponding center wavelengths of the selected portions, (2) adjusting the filter to acquire a first plurality of intensity measurements by sampling the optical spectrum at corresponding first center wavelengths, the first center wavelengths being spaced apart from each other by a first wavelength interval, (3) comparing each of the first plurality of intensity measurements to adjacent ones of the first plurality of intensity measurements, (4) selecting one of the first center wavelengths having a corresponding first intensity measurement greater than the adjacent ones of the first plurality of intensity measurements, (5) adjusting the filter to acquire a second plurality of intensity measurements by sampling the optical spectrum at corresponding second center wavelengths intermediate the selected one of the first center wavelengths and the corresponding first center wavelengths of the adjacent ones of the first plurality of intensity measurements, the second center wavelengths being spaced apart from the selected one of the first center wavelengths by a second wavelength interval less than the first wavelength interval, (6) selecting one of the second center wavelengths having a corresponding second intensity measurement greater than the others of the second plurality of intensity measurements, and (7) adjusting the filter to acquire a third plurality of intensity measurements by sampling the optical spectrum at corresponding third center wavelengths from the selected one of the second center wavelengths to the selected one of the first center wavelengths, the third center wavelengths being spaced apart from each other by a third wavelength interval less than the second wavelength interval.

Another method is provided by the present invention, of analyzing a plurality of optical carriers within an optical spectrum. The method includes the steps of: (1) providing means for measuring the total intensity of the optical spectrum, (2) providing means for directing the measuring means to measure the total intensity of the optical spectrum at selected wavelengths thereof, (3) directing the measuring means to measure the total intensity of the optical spectrum at a first series of spaced apart wavelengths to thereby produce a corresponding first series of intensity measurements, and (4) directing the measuring means to measure the total intensity of the optical spectrum at a second series of spaced apart wavelengths to thereby produce a corresponding second series of intensity measurements, the second series of spaced apart wavelengths, being taken over a first wavelength range of the optical spectrum from a first one of the first series of wavelengths to a second one of the first series of wavelengths, a third one of the first series of wavelengths being intermediate the first and second ones of the first series of wavelengths and having a corresponding intensity measurement greater than corresponding intensity measurements of the first one and the second one of the first series of wavelengths.

The use of the disclosed apparatus and methods enables precise determination of the wavelengths of optical carriers within an optical spectrum. The methods also provide measurements of characteristics of each of the optical carriers, such as intensity and OSNR, with precision unknown heretofore.

DETAILED DESCRIPTION

Figure 1:
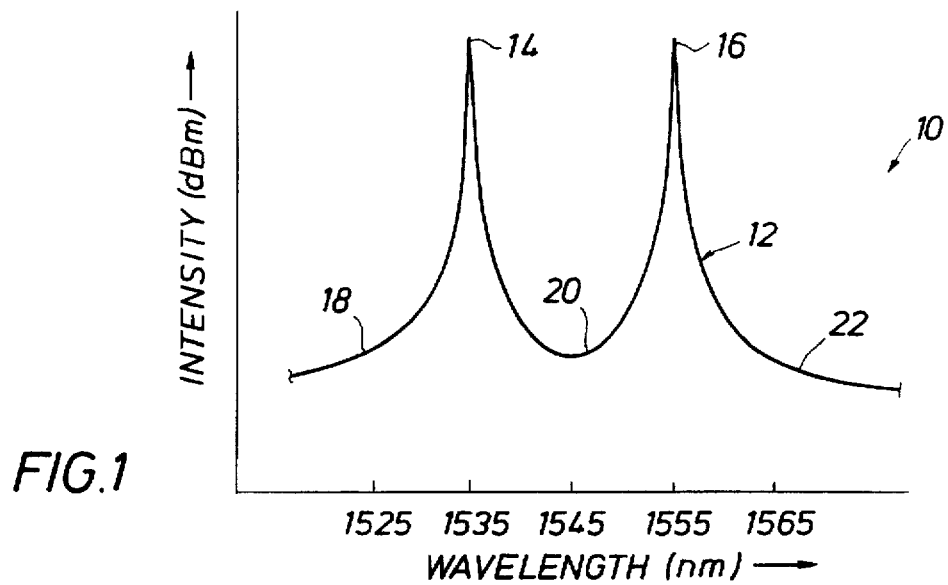
FIG. 1 is a graph of an exemplary optical spectrum, a horizontal axis thereof indicating wavelength in nanometers and a vertical axis thereof indicating intensity, which optical spectrum may be analyzed utilizing apparatus and methods embodying principles of the present invention.

Illustrated in FIG. 1 is a graph 10 of an optical spectrum 12. The horizontal axis of the graph 10 indicates wavelength in nanometers (nm), from approximately 1525 nm to approximately 1565 nm, a range wherein optical carriers transmitted via optical fiber are typically located. The vertical axis of the graph 10 indicates light intensity in decibels (dBm) and is unscaled. It is to be understood that graph 10 and spectrum 12 are merely representative of a typical wavelength range, comparative intensity, distribution, etc., and that other spectrums may be utilized without departing from the principles of the present invention.

The spectrum 12 includes two optical carriers 14 and 16 located at 1535 nm and 1555 nm, respectively. Note that the carriers 14 and 16 are, thus, separated by 20 nm in the exemplary spectrum 12. It will be readily appreciated by one skilled in the art that if the number of carriers multiplexed into the spectrum 12 were increased, the average separation between carriers would conversely decrease, making it more difficult to discern one carrier from another, particularly so if an exact wavelength of a selected carrier is not known beforehand. Although, for purposes of clarity, only two carriers 14 and 16 having a separation of 20 nm are representatively illustrated in the spectrum 12, it is to be understood that fewer or greater numbers of carriers at smaller or larger separations may be utilized without departing from the principles of the present invention.

To either side of the carriers 14 and 16 as viewed in FIG. 1, are noise portions 18, 20, and 22 of the spectrum 12. The noise portions 18, 20, and 22 typically contain no data and are undesirable, but are typically transmitted nonetheless with the carriers 14 and 16. It is important when analyzing an optical spectrum, such as spectrum 12, to accurately determine an OSNR, for example, to evaluate the quality of an optical system. Furthermore, it is very important when evaluating the quality of a particular optical carrier, such as carrier 14 or 16, to accurately determine an OSNR for that particular carrier, since the noise and signal associated with that particular carrier typically varies with respect to other carriers in the optical system.

It may now be fully appreciated that prior devices, such as optical spectrometers, which sample an optical spectrum at preset intervals are inadequate for precisely determining a wavelength of an optical carrier. If, for example, a wavelength of an optical carrier is 1535.27 nm and an optical spectrometer is set to sample the optical spectrum at 0.5 nm intervals beginning at 1525 nm, a sample would not be taken at 1535.27 nm and the actual intensity of the optical carrier would not be determined, or the optical carrier may not be identified as such, depending upon the wavelength bandwidth of the optical carrier. Even if the optical spectrometer were preset to take a sample at a wavelength corresponding to a known optical carrier, the actual intensity of the optical carrier still may not be determined as it is common for the wavelengths of optical carriers to drift.

Figure 2:
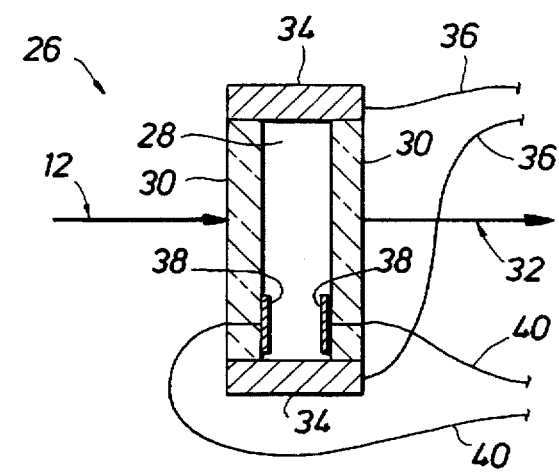
FIG. 2 is a highly schematicized cross-sectional view of a prior art etalon device usable in the optical spectrum analyzing apparatus.

Referring additionally now to FIG. 2, a prior art device 26 is shown which may be utilized in a preferred apparatus embodiment of the present invention further described hereinbelow. The device 26 is an etalon filter of the type manufactured by Queensgate, Inc. under part no. QF 100-40. The applicants are aware of no prior optical spectrometer which utilizes this type of etalon filter device 26. It is to be understood that other filter devices may be utilized without departing from the principles of the present invention.

Applicants have had the filter 26 modified to make it more suitable for the precise optical measurements hereinbelow described. In particular, applicants prefer that the filter 26 have a resolution of better than 0.01 nm, free spectral range of 44 nm+/−2 nm, a minimum finesse of 165 with a nominal finesse of 220 (at R=98.6%+/−0.5%), an FWHM (free spectral range/finesse) between 0.12 nm and 0.27 nm, an insertion loss less than 6 dB, and a return loss better than −20 dB.

In operation, the filter 26 is placed in the path of an optical spectrum, such as spectrum 12. Depending upon the width of an air gap 28 between a pair of spaced apart flat parallel plates 30, a selected bandwidth portion 32 of the spectrum 12 is permitted to pass through the filter 26. By altering the width of the air gap 28, the wavelength of the selected portion 32 of the spectrum 12 passed through the filter 26 may be varied.

The width of the air gap 28 is altered by means of a pair of piezoelectric spacers 34 attached a(ross ends of the plates 30. Conductors 36 (only two of which are shown in FIG. 2) permit a voltage to be applied to the spacers 34 to thereby enlarge or reduce the width of the air gap 28.

To ensure precise measurement and, thereby, control of the width of the air gap 28, a conductive material 38, such as conductive epoxy, is applied to each opposing face of the plates 30. Together with the air gap 28 therebetween, the conductive material 38 forms a capacitor having a variable capacitance depending upon the width of the air gap. By measuring the capacitance via conductors 40, the air gap 28 may be precisely determined, and adjustment, if required, may be made by altering the voltage on conductors 36.

Thus, a feedback loop is set up wherein a desired portion 32 of the spectrum 12 may be selected by varying the capacitance between material 38. The corresponding desired capacitance is maintained by varying the voltage on conductors 36 to adjust the width of the air gap 28, which, in turn, varies the capacitance. In this way, the desired portion 32 is selected without regard to factors, such as temperature variations, mechanical shock, etc., which may act to affect the air gap 28.

Figure 3:
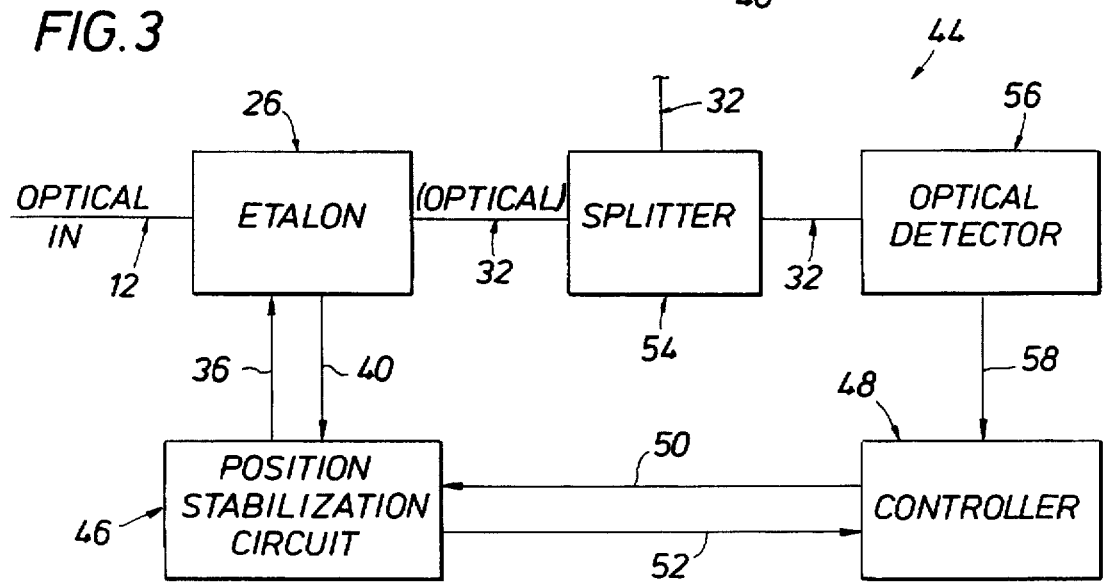
FIG. 3 is a block diagram of the apparatus showing an interconnection of components thereof.

Referring now additionally to FIG. 3, apparatus 44 embodying principles of the present invention is representatively illustrated in block diagram form. The previously described etalon filter 26 is representatively illustrated as a box labeled "Etalon" in FIG. 3. The filter 26 is disposed in the path of the optical spectrum 12, representatively illustrated in FIG. 3 by the line labeled "Optical In". A selected portion of the spectrum 32, which is passed through the filter 26, is represented by the line labeled "(Optical)" in FIG. 3.

A position stabilization circuit 46 ensures that the filter 26 is stabilized such that the center wavelength of the selected portion 32 of the optical spectrum 12 remains invariable during sampling steps described hereinbelow. Conductors 40 interconnect the conductive material 38 and the position stabilization circuit 46, permitting the circuit to measure the capacitance as described above. Conductors 36 interconnect the circuit 46 and the piezoelectric spacers 34, permitting the circuit to adjust the width of the air gap 28, thus completing the feedback loop described above. Although other position stabilization circuits may be utilized in the apparatus 44 without departing from the principles of the present invention, applicants prefer a conventional circuit manufactured by Queensgate, Inc. under part number QC101.

A controller 48 is interconnected with the circuit 46 via conductors 50 and 52. Controller 48 directs the circuit 46 to adjust the filter 26 so that the selected portion 32 which passes through the filter has a selected center wavelength. Controller 48 may also be programmed to direct the circuit 46 to adjust the filter 26 so that the filter passes selected portions of spectrum 12 at selected center wavelength intervals.

The conductors 50 transmit the above described direction from the controller 48 to the circuit 46. Conductor 52 transmits precise measurements of the center wavelength of the selected portion 32 from the circuit 46 to the controller 48.

An optional splitter 54 of conventional design is disposed in the path of the selected portion 32. In this manner, the portion 32 may be diverted for analysis by other instruments, connection to other devices, etc. Note that the undiverted portion 32 also passes through the splitter 54 and then enters an optical detector 56.

Optical detector 56 is of conventional design and is utilized for measuring the intensity of the portion 32. A conductor 58 interconnects the detector 56 and the controller 48, and transmits the intensity measurements from the detector to the controller.

The controller 48, therefore, selects the portion 32 of the spectrum 12 to sample, directs the circuit 46 to adjust the filter 26 to sample that selected portion, receives a measurement of the center wavelength of the selected portion, and receives a measurement of the intensity of the selected portion from the detector 56. Pursuant to a novel feature of the apparatus 44 of the present invention as further described hereinbelow, the controller 48 also evaluates the measurements received from the circuit 46 and detector 56, and directs further sampling based on the evaluations in order to precisely locate carrier wavelengths, and determine intensities and OSNR's.

Figure 4:
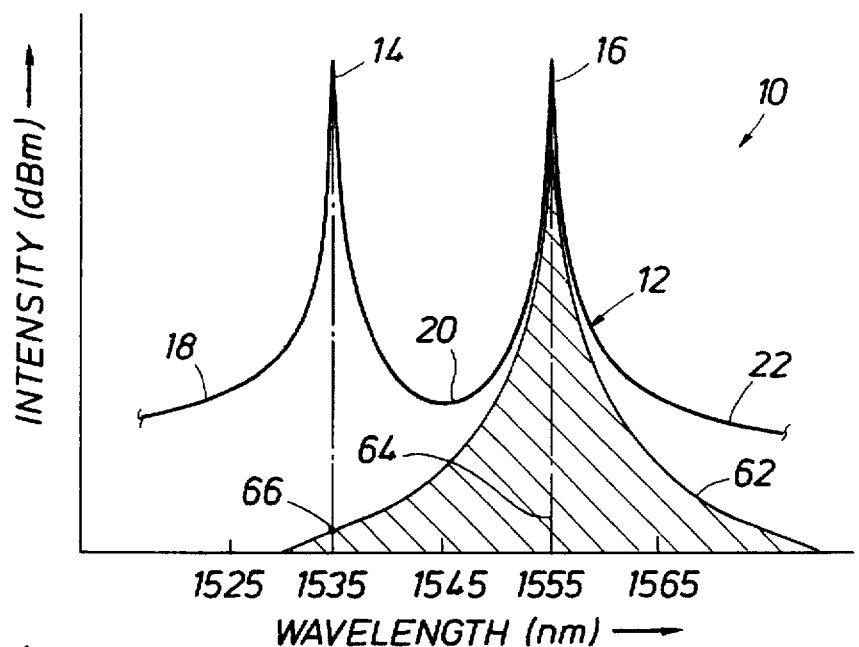
FIG. 4 is the graph of FIG. 1 with a superimposed filter profile thereon, a center wavelength of the filter profile being aligned with an optical carrier portion of the spectrum.
Figure 5:
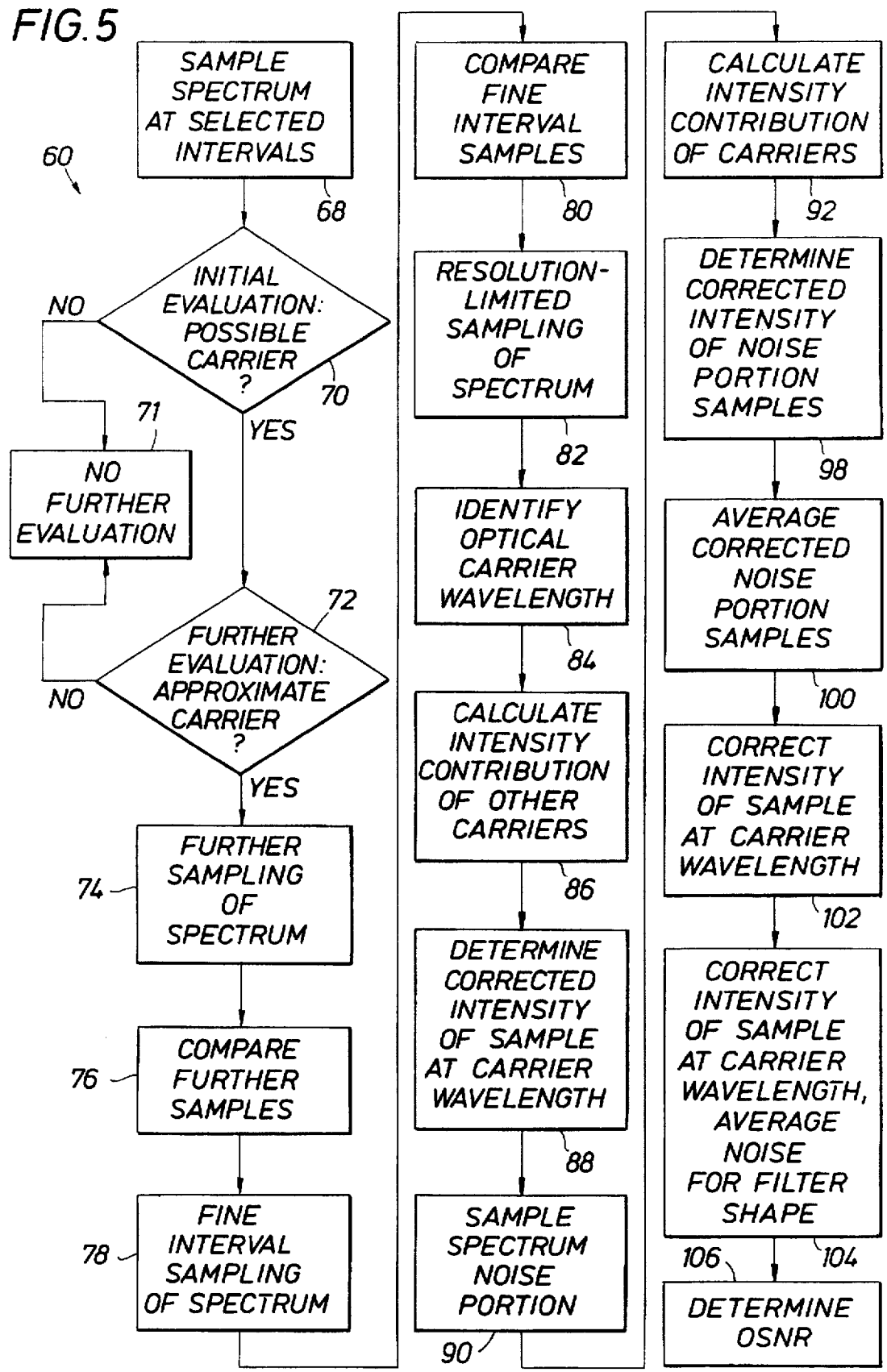
FIG. 5 is a flow chart of the optical spectrum analyzing method.

Referring additionally now to FIGS. 4 and 5, the graph 10 previously described in the written description accompanying FIG. 1 above is illustrated and a method embodiment 60 of the present invention is illustrated in block diagram form. In FIG. 4, a filter profile 62 has been imposed upon the spectrum 12, the filter profile being representatively illustrated as a cross-hatched region having a center wavelength 64 at 1555.00 nm and, therefore, precisely aligned with the previously described optical carrier 16 of the spectrum 12. Filter profile 62 represents a range of wavelengths and intensities which pass through the filter 26 as the selected portion 32 of the spectrum 12.

In order to precisely align the filter profile 62 with any of the carriers 14, 16 of spectrum 12, the method 60 shown in FIG. 5 includes a series of spectrum sampling, evaluating, and resampling steps which will now be described. It is to be understood that the order of the steps, wavelengths sampled, number of samples, etc. of the method 60 may be varied without departing from the principles of the present invention.

In step 68 of method 60, the controller 48 directs the position stabilization circuit 46 adjust the filter 26 to sample the spectrum 12 at selected intervals between minimum and maximum limits of the spectrum. For example, for the spectrum 12 representatively illustrated in FIG. 4, the controller 48 may direct the circuit 46 to adjust the filter 26 to sample the spectrum at 0.20 nm intervals from 1525 nm to 1565 nm. Initial samples would thus be taken at center wavelengths 1525.00, 1525.20, 1525.40, 1525.60, . . . , 1564.60, 1564.80, and 1565.00 nm. The detector 56 measures the intensity of the selected portion 32 resulting from application of the filter profile 62 to the spectrum 12 at the center wavelengths.

For each initial sample, in step 70 the controller 48 performs an initial evaluation to determine whether the initial sample center wavelength may be at or adjacent a possible optical carrier wavelength. In a preferred embodiment, for each initial sample the controller 48 tests whether the two initial samples having smaller center wavelengths and the two initial samples having greater center wavelengths immediately adjacent the initial sample have intensities less than that of the initial sample. For example, in the spectrum 12, an initial evaluation of an initial sample taken at a center wavelength of 1535.00 nm will show that the intensities of the adjacent two initial samples having smaller wavelengths (at 1534.60 and 1534.80 nm center wavelengths) and the intensities of the adjacent two initial samples having greater wavelengths (at 1535.20 and 1535.40 nm center wavelengths) are less than the intensity of the 1535.00 nm center wavelength initial sample. The initial evaluation in that case is positive and the 1535.00 nm center wavelength of the initial sample is tagged as the wavelength of a possible optical carrier.

In step 71, if the evaluation for an initial sample is negative, no further evaluation is performed for that sample and the next initial sample is then evaluated at step 70.

If the initial evaluation is positive, in step 72 a further evaluation is performed to determine whether the possible optical carrier may be an approximate carrier or may actually be nothing more than an anomaly or noise. For example, for each possible optical carrier wavelength identified in step 70, the controller 48 sets a threshold level and tests whether adjacent samples at center wavelengths less than and greater than the possible optical carrier wavelength have intensities less than the threshold level.

In a preferred embodiment, the controller 48 sets a threshold level of eighty percent of the measured intensity of the possible optical carrier initial sample and tests whether at least one of the two adjacent initial samples at center wavelengths greater and less than the possible optical carrier center wavelength have intensities less than the threshold level. If the further evaluation is positive, the possible optical carrier initial sample wavelength is tagged as an approximates optical carrier wavelength. Otherwise, the controller 48 proceeds to step 71 as described above.

In step 74, for each approximate optical carrier identified in step 72, the controller 48 directs the circuit 46 to adjust the filter 26 to sample the spectrum 12 at center wavelengths less than and greater than the wavelength of the approximate optical carrier. In a preferred embodiment, a further sample is taken at a center wavelength somewhat more than half the difference between the wavelength of the approximate optical carrier and the center wavelength of each adjacent initial sample. For example, if an approximate optical carrier is identified at an initial sample center wavelength of 1535.00 nm, further samples are taken at center wavelengths of 1534.88 and 1535.12 nm, and the measured intensities are transmitted to the controller 48 from the detector 56.

In step 76, the measured intensities of the further samples taken in step 74 are compared to each other in the controller 48. The center wavelength of the further sample having the greatest intensity is utilized as a limit of a range of wavelengths, the center wavelength of the approximate optical carrier identified in step 72 being the other limit. For example, if an approximate optical carrier is identified at an initial sample center wavelength of 1535.00 nm and further samples are taken at 1534.88 and 1535.12 nm center wavelengths as described above in step 74, and the further sample taken at the center wavelength of 1535.12 nm has an intensity greater than that of the further sample taken at the center wavelength of 1534.88 nm, the limits of the range of wavelengths are defined as having center wavelengths of 1535.00 nm and 1535.12 nm.

In step 78, fine interval samples are taken at center wavelengths over the range defined in step 76. Preferably, the fine interval samples are taken at center wavelength intervals equal to approximately twice the resolution of the filter 26. As previously described, the preferred filter 26 has a resolution of better than 0.01 nm. Therefore, in a preferred embodiment, fine interval samples are taken at intervals of 0.02 nm over the defined range of wavelengths, e.g., at center wavelengths of 1535.00, 1535.02, . . . , 1535.10, and 1535.12 nm. The intensity of each of the fine interval samples are measured by the detector 56 and transmitted to the controller 48.

In step 80, the controller 48 compares the fine interval sample intensities and determines which has the greatest intensity. For example, for fine interval samples taken of spectrum 12 over the range of center wavelengths from 1535.00 nm to 1535.12 nm, the fine interval sample at a center wavelength of 1535.00 nm will have the greatest intensity.

In step 82, the controller 48 directs the circuit 46 to adjust the filter 26 to sample the spectrum 12 at center wavelengths less than and greater than the center wavelength of the fine interval sample having the greatest intensity. Preferably, the controller 48 directs the circuit to adjust the filter 26 to sample at center wavelengths less than and greater than the center wavelength of the greatest intensity fine interval sample by an amount equal to the resolution of the filter 26. For example, in a preferred embodiment wherein a filter, such as filter 26, having a resolution of 0.01 nm is utilized, and the greatest intensity fine interval sample center wavelength is at 1535.00 nm, resolution-limited samples are taken at 1534.99 nm and 1535.01 nm center wavelengths. The intensities of the last taken samples are measured by the detector 56 and transmitted to the controller 48.

In step 84, the intensities of the greatest intensity fine interval sample and the last taken samples are compared and the greatest of these is identified as having a center wavelength of an optical carrier. For example, in the representatively illustrated spectrum 12, if the above described greatest intensity fine interval sample at a center wavelength of 1535.00 nm has an intensity greater than the intensity of either of the resolution-limited samples taken at center wavelengths of 1534.99 nm and 1535.01 nm, the 1535.00 nm center wavelength fine interval sample is identified as having a center wavelength of an optical carrier.

In a further portion of the preferred method 60, the measured intensity of each sample identified as having a center wavelength of an optical carrier is corrected to compensate for contributions to the measured intensity thereof from other optical carriers in the optical spectrum. In a preferred embodiment, the shape of the filter profile 62 is known, enabling calculation of the contribution to the measured intensity of each sample identified as having a center wavelength of an optical carrier from other optical carriers as is more fully described hereinbelow.

For example, if a sample of spectrum 12 is taken at a center wavelength of 1555.00 nm and that center wavelength is identified as being that of the optical carrier 16 wavelength in step 84, the filter profile 62 is seen in FIG. 4 to intersect the adjacent optical carrier 14 at 1535.00 nm.

The mathematical shape of the filter profile 62 being known, the intensity at point 66 is calculated by the controller 48 in step 86. The intensity at point 66 is the contribution to the intensity measured for the sample taken at the center wavelength of 1555.00 nm.

In step 88, the measured intensity for each sample taken at a center wavelength identified as being that of an optical carrier wavelength is corrected to compensate for contributions from all other optical carriers in the spectrum calculated in step 86. In the illustrated preferred embodiment, the controller 48 has the filter profile 62 stored in memory and, after all samples having a center wavelength identified as beings that of an optical carrier are identified, performs the calculations in step 86 to determine the contributions from all other optical carriers in the spectrum to the intensity measurements of each of those samples as described above. In step 88, the contributions from all other optical carriers are then subtracted from the intensity measurements of each of those samples.

Figure 6:
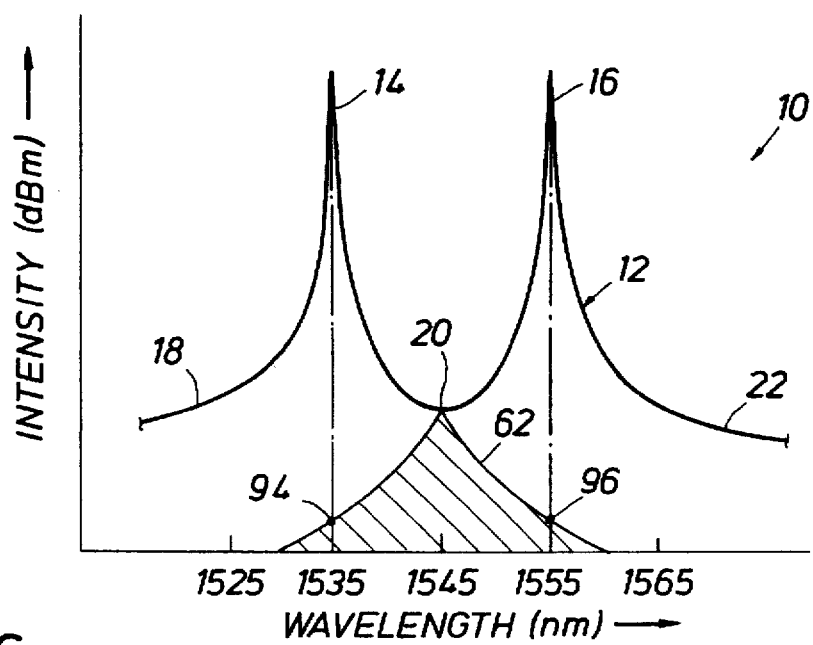
FIG. 6 is the graph of FIG. 1 with the superimposed filter profile thereon, a center wavelength of the filter profile being aligned with an optical noise portion of the spectrum.

Referring additionally now to FIG. 6, in yet another portion of the method 60, noise associated with each optical carrier is determined. Representatively illustrated in FIG. 6 is the optical spectrum 12 of FIG. 1, wherein the controller 48 has directed the circuit 46 to adjust the filter 26 to sample noise portion 20 of the spectrum. The filter profile 62 being known, as previously described hereinabove, such a noise portion sample may be corrected for contributions to its measured intensity from optical carriers 14 and 16.

In step 90 of the method 60, samples are taken of noise portions of the spectrum 12 having wavelengths greater than and less than wavelengths of the optical carriers identified in step 84. For example, in the representatively illustrated spectrum 12, for optical carrier 14, noise portion 18 may be sampled at a center wavelength of 1525.00 nm and noise portion 20 may be sampled at a center wavelength of 1545.00 nm. The detector 56 measures the intensities of the noise portion samples and transmits the intensity measurements to the controller 48.

In step 92, for each of the samples of noise portions taken in step 90, intensity measurement contributions thereto from optical carriers in the spectrum are calculated in the same manner as described above in step 86 for the intensity measurements of samples taken at center wavelengths of optical carriers. For example, in FIG. 6 filter profile 62 is seen to intersect wavelengths of optical carriers 14 and 16 at points 94 and 96, respectively. In a preferred embodiment, the controller 48 utilizes the filter profile 62 stored in its memory to calculate intensities of points 94 and 96 as described above in step 86.

In step 98, the measured intensity for each sample taken at a noise portion center wavelength is corrected to compensate for contributions from optical carriers in the spectrum calculated in step 92. In the illustrated preferred embodiment, the controller 48 has the filter profile 62 stored in memory and performs the calculations in step 92 to determine the contributions from all optical carriers in the spectrum to the intensity measurements of each of the noise portion samples taken in step 90. In step 98, the contributions from optical carriers are then subtracted from the intensity measurements of each of the noise portion samples.

In step 100, for each optical carrier identified in step 84, the corrected intensities of the immediately adjacent noise portion samples having center wavelengths greater than and less than that of the optical carrier are averaged, producing an average corrected noise intensity measurement for each optical carrier in the spectrum. For example, in the representatively illustrated spectrum 12 shown in FIG. 6, for optical carrier 16, if in step 90 noise portion 20 is sampled at center wavelength 1545.00 nm and noise portion 22 is sampled at center wavelength 1565.00 nm, and these noise portion intensity measurements are corrected for contributions from carriers 14 and 16 in steps 92 and 98, the corrected noise portion intensity measurements are averaged by controller 48 to produce an average corrected noise intensity measurement for carrier 16.

In step 102, for each optical carrier identified in step 84, the corrected intensity (from step 88) of the sample taken at a center wavelength corresponding to that carrier is further corrected by the controller 48 for the average noise intensity determined in step 100 for that carrier. For example, for optical carrier 16 of spectrum 12, for which an average corrected noise intensity measurement was determined in step 100, that average corrected noise intensity measurement is subtracted from the corrected intensity of the sample taken at a center wavelength of 1555.00 nm, which corrected intensity was determined in step 88.

In step 104, for each optical carrier identified in step 84, the further corrected intensity of the sample taken at a center wavelength corresponding to that carrier, which further corrected intensity was determined in step 102, and the average noise intensity determined in step 100 for that carrier, are still further corrected by the controller 48 for the shape of the filter profile 62. The correction performed in step 104 is to compensate for adjacent noise sampled by the filter 26. Preferably, the controller 48 divides the further corrected intensity of the sample taken at the carrier wavelength and the average noise by an empirically-determined calibration factor. This step produces an accurate measured intensity for each optical carrier, which carrier intensity measurement has been corrected for contributions of other carriers thereto in steps 86 and 88, for average noise associated therewith in step 100, and for adjacent noise within the filter profile shape. This step also produces an accurate measurement of the average noise intensity associated with each carrier, which noise intensity measurement has been corrected for contributions of other carriers thereto in steps 92 and 98, and for the filter profile shape.

Using the accurate carrier and average noise intensity measurements obtained in step 104, the OSNR for each carrier identified in step 84 is calculated in step 106 by dividing the carrier intensity measurement by its associated average noise intensity measurement. The OSNR for each carrier is then corrected by multiplying it by an empirical correction factor determined through calibration of the apparatus 44. During calibration, known optical signal and noise intensities are compared to those measured by the apparatus 44 and a look-up table of correction factors is placed in memory in the controller 48. In a preferred embodiment, the controller 48 performs this calculation and displays for each carrier identified in step 84: the optical carrier wavelength with an accuracy of +/−0.02 nm, the intensity of the carrier, and the OSNR of the carrier.

Attached hereto is an Appendix containing a listing for a program. The program is utilized by applicants in the disclosed preferred embodiment of the controller 48. As will be readily apparent to one skilled in the art, the program contains specific instructions for carrying out portions of method 60. Other programs may be utilized for carrying out portions of method 60 without departing from the principles of the present invention.

The foregoing detailed description is to be clearly understood as being given by way of illustration and example only, the spirit and scope of the present invention being limited solely by the appended claims.

APPENDIX (c) 1995 Wavelinq, Inc.

```
/* START LIBRARY DESCRIPTION ****************************************
LOCATE.LIB

DESCRIPTION: Multi-WAVE Test Set Library

PURPOSE: AutoLocate Channels (Scan 1525-1565)

HISTORY: Created Dec 6, 1994

SUPPORT LIB'S: MWAVE.LIB, HEADER.LIB
END DESCRIPTION ****************************************************/

/*** BeginHeader

LocatePP, LocateSignals, SetPeakWaveLength, LoadTemplates,
        ReadPeakWaveLength, LocatePeaks, RestartLocate, FindChannels,
        CorrectedPower, SNOffsetPower, LoadLCTemplate, LocHeader, LocChannel,
        LocTemplate, LocateCount, ChannelCount, DisplayDefaults, LocChannels,
        LocTemplates, AutoLocate, MarkPoints, GrLocate, LocateKeyboard,

*/ End of Functions in this Library

//=================================================================//
// The use of the "shared" keyword is required when accessing variables //
// with interrupts enabled. To insure multi-byte variables are not     //
// corrupted, interrupts are turned off (if on) during the multi-byte read //
// and write of the variable. This avoids the possiblity of an interrupt  //
// routine changing a variable between reading the first bytes and the last //
// bytes, which would result in reading a corrupted value.             //
//=================================================================// void    LocatePP(float StartWvl, float EndWvl);
int     LocateSignals(int StartSlot, int StopSlot);
void    LoadTemplates(void);
float   SetPeakWaveLength(float WaveLength);
int     LocatePeaks(int FirstSlot, int LastSlot);
void    RestartLocate(void);
void    FindChannels(void);
float   CorrectedPower(float Power, int Offset);
float   SNOffsetPower(float WaveLength);
void    LoadLCTemplate(void);
void    LocHeader(char SlotNo);
void    LocChannel(char SlotNo, char Line);
void    LocTemplate(char SlotNo, char Line);
int     LocateCount(void);
int     ChannelCount(int TmplNo);
void    DisplayDefaults(void);
void    LocChannels(void);
void    LocTemplates(void);
void    AutoLocate(void);
void    MarkPoints(float Wavelength, float PwrOffset);
void    LocateKeyboard(int Key);
void    ClearLC(void);
void    GrLocate(void);

/*** EndHeader */

/*=================================================================\
|         LOCATE Menu KeyBoard Handler                              |
\=================================================================*/ indirect xmem void   LocateKeyboard(int Key)
```

APPENDIX

```
{
    //--- Process Locate Menu Keyboard Key ----------------------------//
    switch (Key)
    {
        case STOP_KEY  : HaltCollection();
                         break;
        //--- Re-Start Locate Channel function ------------------------//
        case START_KEY : RestartLocate();
                         break;
        case F1_KEY    : PlotActive = FALSE;
                         DisplayMenu(&PlotPtr,&LocatePtr);
                         break;
        //--- Go to Channel Summary Screen - Previous screen Locate ---//
        case F2_KEY    : if (ChannelDefined())
                             DisplayMenu(&SummPtr,&LocatePtr);
                         break;
        //--- Go to Channel Detail Screen - Previous screen Locate ----//
        case F3_KEY    : if (ChannelDefined())
                             DisplayMenu(&DetailPtr,&LocatePtr);
                         break;
        //--- Go to Channel Tracking Screen - Previous screen Locate --//
        case F4_KEY    : if (ChannelDefined())
                             DisplayMenu(&TrackPtr,&LocatePtr);
                         break;
        case UP_KEY    :
        case DOWN_KEY  : SelectActive(Key);
                         break;
        case MENU_KEY  : MenuKey();
                         break;
        case TMPLT_KEY : TmpltKey();
                         break;
        case STORE_KEY : ClearMsg();
                         Set_Display_Mode(DISPLAY_GRAPHICS | DISPLAY_TEXT);
                         StoreKey(LOCATE_DATA,&LocatePtr);
                         break;
        case HELP_KEY  : DisplayHelp(HELP_NDX_LOCATE,NULL,1);
                         DisplayMenu(&LocatePtr,NULL);
                         break;
        default        : lk_setbeep(20);
                         UpDownMsg(TmplChnMsg);
                         break;

} // End for main keys //

} // Execute Locate Key //

/*==========================================================================*\
|      Set Peak Power for Center Wavelength of all valid channels located    |
\*==========================================================================*/ indirect xmem int   LocatePeaks(int FirstSlot, int LastSlot)
{
        int    SlotNo, SlotsFound;
        float  PeakWaveLength;

if (ActiveMenu == &LocatePtr && !CollectData)
        {
           sprintf(TextBuff,"(Locate Signal Peaks)");
           WriteText(TextBuff,1,9);
        }

SlotsFound = 0;              // Reduces line length ------//

//--- Search for valid wavelength found during locate channels ---//
        for (SlotNo = FirstSlot; SlotNo <= LastSlot && SlotsFound < MAX_CHANNELS
```

-29-

APPENDIX

```
                && !kb_flag; SlotNo++)
            if (LCPoints[SlotNo].Status == VALID_SLOT)
            {
                UpdateClock();
                LCPoints[SlotNo].Status = EMPTY_SLOT;

//--- Find peak wavelength (Highest ADValue) ----------------//
                if ((PeakWaveLength =
SetPeakWaveLength(LCPoints[SlotNo].WaveLength)) != 0)
                    if (HalfPowerPoints(PeakWaveLength))
                        if (fabs(LCPoints[SlotNo].WaveLength - PeakWaveLength) <=
DefaultRange)
                        {
                            LCPoints[SlotNo].Status = VALID_SLOT;
                            LCPoints[SlotNo].ADValue = (SetPMRange() *
RangeFactor[RangeNo]);
                            LCPoints[SlotNo].WaveLength = PeakWaveLength;
                            LCPoints[SlotNo].Power = (FixedPower() + PWR_Correction +
USER_Correction);
                            SlotsFound++;
                        }
                        else
                            MarkPoints(LCPoints[SlotNo].WaveLength,0);

} // End for MAX_SLOT_RETRY - read peak wavelength // return(SlotsFound);

} // End find maximum power at center wavelength //

/*---=================================================================---*\
|   Set Peak Power for Center Wavelength of all valid channels located    |
|   . Modified to use channel 1 to locate peak within range               |
\*---=================================================================---*/ indirect xmem float SetPeakWaveLength(float WaveLength)
{
        int     Slot, PeakSlot;
        unsigned long PeakPower, ADValue;
        float   NextWvl;

PeakPower = 0;          // Insure first reading is always higher ----//
        NextWvl = WaveLength - .12;

//--- For each wavelength, check in .1 nanometer steps --------------//
        for (Slot = 0; Slot < MAX_PEAK_POINTS && !kb_flag; Slot++, NextWvl +=
SHIFT_VALUE)
        {
                SetWaveLength(GetPIOBits(NextWvl),DelayTime[RangeNo]);
                if ((ADValue = (SetPMRange() * RangeFactor[RangeNo])) > PeakPower)
                {
                    PeakSlot = Slot;
                    PeakPower = ADValue;

} // End setup maximum peak power slot //

} // End check power of Wavelength plus/minus .2 nm //

//--- Insure signal is not at extreme ends (Signal Moved!) ----------//
        if (PeakSlot > MIN_PEAK && PeakSlot < MAX_PEAK)
        {
            PeakSlot = (PeakSlot - (MAX_PEAK_POINTS / 2));
```

-30-

APPENDIX

```
        WaveLength = Dither(WaveLength + (PeakSlot * SHIFT_VALUE));
        SetWaveLength(GetPIOBits(WaveLength),DelayTime[RangeNo]);
        return(WaveLength);

} // End if not at extremes //

//--- Wavelength is invalid, moved left or right > .1 ---------------//
        MarkPoints(WaveLength + ((PeakSlot - (MAX_PEAK_POINTS / 2)) *
SHIFT_VALUE),0);
        return(0);

} // End find center power slot in PeakSlots //

/*===========================================================================\
|                                                                             |
\*===========================================================================*/ indirect xmem void    ClearLC(void)

{
        int    SlotNo;

//--- Auto Locate runs once or until user re-starts locate ----------//
        for (SlotNo = 0; SlotNo < MAX_PP; SlotNo++)
        {
           LCPoints[SlotNo].Status = EMPTY_SLOT;
           LCPoints[SlotNo].ADValue = 0;
           LCPoints[SlotNo].Power = 0;
           LCPoints[SlotNo].WaveLength = 0;
        }

} // End clear all Points used by Locate/Sysinit/Scan //

/*===========================================================================\
|                                                                             |
\*===========================================================================*/ indirect xmem void    LocatePP(float FirstWaveLength, float LastWaveLength)

{
        int    Step, SlotNo;
        float  WaveLength, StartWvl, EndWvl;

ClearChannels(LC_TEMPLATE);     // Set all channels to EMPTY status -//
        ReCalibrate();                  // Calibrate PIOBits to Analog ------//
        PeakADValue = 0;                // Peak Analog reading Channel 1 ----//
        //--- Start blinking "Searching" mode at top of menu ----------------//
        SetMessage(SearchMsg,2,0,CENTER | BLINK);

//--- Set Start and Ending Wavelength .6 offset for signal checks ---//
        StartWvl = FirstWaveLength - (SLOT_OFFSET * SLOT_VALUE);
        EndWvl = LastWaveLength + (SLOT_OFFSET * SLOT_VALUE);

//--- Step through min to max wavelength in nanometers --------------//
        for (WaveLength = StartWvl, SlotNo = 0; WaveLength <= EndWvl;
WaveLength++)
        {
           //--- Show user our scanning progress ----------------------------//
           if (WaveLength +.4 <= LastWaveLength)
           {
               sprintf(TextBuff,"{Scanning: %7.2f}", WaveLength+.4);
               WriteText(TextBuff,1,10);

} // End if within min/max values //
```

-31-

APPENDIX

```
        UpdateClock();                    // Keep the Clock semi-accurate.. ---//

//--- For each wavelength, check in .2 nanometer steps ----------//
        for (Step = 0; Step < 5 && SlotNo < MAX_PP; Step++)

if (WaveLength+Steps[Step] <= EndWvl)
            {
                LCPoints[SlotNo].WaveLength = WaveLength+Steps[Step];

//--- SetWavelength has built in settling delay time -------//
SetWaveLength(GetPIOBits(LCPoints[SlotNo].WaveLength),DelayTime[RangeNo]);

//--- Read Analog Channel 1 value for this wavelength ------//
                if ((LCPoints[SlotNo].ADValue = (SetPMRange() *
RangeFactor[RangeNo])) > PeakADValue)
                {
                    PeakADValue = LCPoints[SlotNo].ADValue;
                    PeakADWaveLength = LCPoints[SlotNo].WaveLength;

} // End new high peak power/slot //

SlotNo++;

} // End found new channel to add //

} // End for min to max wavelength //

FindChannels();                    // Look for found channels --//

} // End search powerpoints for real channels //

/*---==========================================================================*\
|       Search Powerpoints for Channels and add extended memory                 |
\*============================================================================*/ indirect xmem int   LocateSignals(int StartSlot, int StopSlot)

{
        int     Slot, SlotsFound;

//--- Search all slots for valid signals, MINIMUM_POWER equals 0 ---//
        for (Slot = StartSlot, SlotsFound = 0; Slot <= StopSlot; Slot++)
        {
            LCPoints[Slot].Status = EMPTY_SLOT;

//--- Check prev slot and next slot for lower/higher power -------//
            if (LCPoints[Slot-1].ADValue < LCPoints[Slot].ADValue &&
                LCPoints[Slot+1].ADValue < LCPoints[Slot].ADValue)

//--- Check 2 slots prev and 2 slots forward for power ---------//
                if (LCPoints[Slot-2].ADValue < LCPoints[Slot].ADValue &&
                    LCPoints[Slot+2].ADValue < LCPoints[Slot].ADValue)

//--- Power levels of 1 prev slot must be >= 3db ------------//
                    if ((LCPoints[Slot-1].ADValue <= (LCPoints[Slot].ADValue /
DB_FACTOR) &&
                        LCPoints[Slot].ADValue > MINIMUM_POWER) ||
                        (LCPoints[Slot-2].ADValue <= (LCPoints[Slot].ADValue /
DB_FACTOR) &&
                        LCPoints[Slot].ADValue > MINIMUM_POWER))

//--- Must divide to insure no ulong overflow ------------//
                        if ((LCPoints[Slot+1].ADValue <= (LCPoints[Slot].ADValue /
```

-32-

APPENDIX

```
                DB_FACTOR) &&
                                    LCPoints[Slot].ADValue > MINIMUM_POWER) ||
                                (LCPoints[Slot+2].ADValue <= (LCPoints[Slot].ADValue /
                DB_FACTOR) &&
                                    LCPoints[Slot].ADValue > MINIMUM_POWER))
                            {
                                LCPoints[Slot].Status = VALID_SLOT;
                                SlotsFound++;

} // End if good slot //

} // End for all Power Points // return(SlotsFound);

} // End search powerpoints for real channels //

/*-------------------------------------------------------------------*\
|       Mark Peak WaveLength/Power for Loss/Not Found Errors          |
\*-------------------------------------------------------------------*/ indirect xmem void MarkPoints(float WaveLength, float PwrOffset)

{
        if (WaveLength < MIN_WAVELENGTH)
            WaveLength = MIN_WAVELENGTH;
        else
            if (WaveLength > MAX_WAVELENGTH)
                WaveLength = MAX_WAVELENGTH;

MPeakWaveLength = WaveLength;
        SetWaveLength(GetPIOBits(MPeakWaveLength),DelayTime[RangeNo]);
        SetPWRange();
        MPeakPower = FixedPower() + PWR_Correction + USER_Correction + PwrOffset;
        MWPower = MPeakPower;
        ChannelLost = TRUE;
        ChannelFail = TRUE;

} // End error peak points //

/*-------------------------------------------------------------------*\
|                                                                     |
\*-------------------------------------------------------------------*/ indirect xmem void LocChannel(char SlotNo, char Line)

{
                float   SNoise;

//-- Undefined if channel in LC Template but not in ACTIVE Template --//
                if (GetChanStatus(SlotNo,ActiveTmplNo) & UNDEFINED_SLOT)
                {
                    WriteText("--",Line,0);
                    WriteText("Undefined ",Line,3);
                }
                else
                    //--- Good channel, display actual channel number assigned -------//
                    {
                        sprintf(TextBuff,"%02d",GetChanNo(SlotNo,ActiveTmplNo));
                        WriteText(TextBuff,Line,0);
                        sprintf(TextBuff,"%+7.2f nm",GetWaveLength(SlotNo,ActiveTmplNo));
                        WriteText(TextBuff,Line,3);
                    } if (ValidLocate)
```

-33-

APPENDIX

```
                if (GetLocSNoise(SlotNo,ActiveTmplNo) != DEFAULT_SNOISE)
                {
   ...//           //--- Remaining information is common to both Found and Undefined
                    sprintf(TextBuff,"%+7.2f nm",GetLocWvl(SlotNo,ActiveTmplNo));
                    WriteText(TextBuff,Line,14);
                    sprintf(TextBuff,"%+5.1f dBm",GetLocPower(SlotNo,ActiveTmplNo));
                    WriteText(TextBuff,Line,25);
                    if ((SNoise = GetLocSNoise(SlotNo,ActiveTmplNo)) == LOW_SNOISE)
                       strcpy(TextBuff,"<10dB");
                    else
                       if (SNoise == HIGH_SNOISE)
                          strcpy(TextBuff,">33dB");
                       else
                          sprintf(TextBuff,"%+2d dB",(int) SNoise);
                    WriteText(TextBuff,Line,35);
                }
                else
                {
                    sprintf(TextBuff,"%+7.2f ***",GetLocWvl(SlotNo,ActiveTmplNo));
                    WriteText(TextBuff,Line,14);
                    sprintf(TextBuff,"%+5.1f ****",GetLocPower(SlotNo,ActiveTmplNo));
                    WriteText(TextBuff,Line,25);
                    WriteText("*Loss",Line,35);

}
        } // End if locate channel screen //

/*---=========================================================================*\
|                                                                              |
\*---=========================================================================*/ indirect xmem void   LocChannels(void)

{
        char   Slot;

//--- Display MAX_SCREEN channels for the Define Template screen -//
        for (Slot = 0; Slot < MAX_SCREEN; Slot++)
            } // End if valid wavelength found in Locate Channels //

} // End find maximum power at center wavelength //

/*---=========================================================================*\
|                                                                              |
\*---=========================================================================*/ indirect xmem void   LocHeader(char SlotNo)

{
        if (ActiveMenu == &LocatePtr)
        {
            if (ValidLocate)
               sprintf(TextBuff,"(%02d Total Channels)",LocateCount());
            else
               sprintf(TextBuff,"(%02d Total
Channels)",ChannelCount(ActiveTmplNo));
            WriteText(TextBuff,1,10);
            if (ActiveTmplNo == 0)
               strcpy(TextBuff,"LC");
            else
               sprintf(TextBuff,"%02d",ActiveTmplNo);
            WriteText(TextBuff,3,7);
            UpdateHeader(SlotNo);                  // Channel Range/Bandwidth --//

} // End if Locate Menu //
```

-34-

APPENDIX

```
        if (ChannelCount(ActiveTmplNo) > MAX_SCREEN)
            UpDownKeysMsg(TmplChnMsg);
        else
            ClearStatus();

HighLightBar[2] = 13;
        HighLightBar[3] = 9;

} // End display Define Template Header Information //

/*---=============================================================*\
|                                                                   |
\*---=============================================================*/ indirect xmem void  LocTemplate(char SlotNo, char Line)

{
        //--- Good channel, display actual channel number assigned ---------//
        sprintf(TextBuff,"%02d",GetChanNo(SlotNo,ActiveTmplNo));
        WriteText(TextBuff,Line,0);
        sprintf(TextBuff,"%+7.2f nm",GetWaveLength(SlotNo,ActiveTmplNo));
        WriteText(TextBuff,Line,3);

} // End if locate channel screen //

/*---=============================================================*\
|       Display Total Channels to specified screen location         |
\*---=============================================================*/ indirect xmem int  LocateCount(void)

{
        char    SlotNo, ChannelCnt;

for (SlotNo = 0, ChannelCnt = 0; SlotNo < MAX_CHANNELS; SlotNo++)
            if (GetChanStatus(SlotNo,ActiveTmplNo) & VALID_SLOT)
                if (GetLocWvl(SlotNo,ActiveTmplNo) != 0 ||
                    GetChanStatus(SlotNo,ActiveTmplNo) & UNDEFINED_SLOT)
                    ChannelCnt++;

return(ChannelCnt);

} // End count active channels for template and display //

/*---=============================================================*\
|       Display Total Channels to specified screen location         |
\*---=============================================================*/ indirect xmem int  ChannelCount(int TmplNo)

{
        char    Status, SlotNo, ChannelCnt;

for (SlotNo = 0, ChannelCnt = 0; SlotNo < MAX_CHANNELS; SlotNo++)
            if ((Status = GetChanStatus(SlotNo,TmplNo)) & VALID_SLOT)
                if (!(Status & NEW_SLOT))
                    ChannelCnt++;

return(ChannelCnt);

} // End count active channels for template and display //
```

-35-

APPENDIX

```
/*==========================================================*\
|                                                            |
\*==========================================================*/ indirect xmem void  DisplayDefaults(void)

{
        //--- Display ZERO total channels for no Template defined --------//
        WriteText(TotChanMsg,1,10);
        strcpy(TextBuff,"NA");              // Default Not Applicable ------// if (GetStatus(ActiveTmplNo,Templates,TEMPLATE_SIZE) & VALID_SLOT)
        {
            //--- Setup active template display on main menu ----------------//
            if (ActiveTmplNo == LC_TEMPLATE)
               strcpy(TextBuff,"LC");
            else
               sprintf(TextBuff,"%02d",ActiveTmplNo);

StatusMsg(NoChansFound,0,NULL);

} // End if good active template //
        else
            StatusMsg(NoChansFound,0,NULL);

WriteText(TextBuff,3,7);

//--- Display setup defaults for Template,range and bandwidth --//
        sprintf(TextBuff,"%-3.1f",DefaultRange);
        WriteText(TextBuff,3,19);
        sprintf(TextBuff,"%-4.1f",DefaultBandWidth);
        WriteText(TextBuff,3,34);
} // End no template, display default header info //

/*==========================================================*\
|                                                            |
\*==========================================================*/ indirect xmem void   LocTemplates(void)

{
        char  Slot;

//--- Display MAX_SCREEN channels for the Define Template screen -//
        for (Slot = 0; Slot < MAX_SCREEN; Slot++)
        {
            EraseChanLine(ActiveList[Slot].Line);
            if (ActiveList[Slot].Status & VALID_SLOT)
                LocTemplate(ActiveList[Slot].SlotNo,ActiveList[Slot].Line);

} // End for full screen //

} // End display all channels //

/*==========================================================*\
|       Auto Locate Channels and add to Linked List          |
\*==========================================================*/ indirect xmem void  AutoLocate(void)

{
        if (ValidLocate)
        {
```

-36-

APPENDIX

```
        LoadUndefined();   // Place undefined channels in Active Tmpl -//
        SortChannels(ActiveTmplNo);
        ResetActive();
        LocFunction = LocChannels;
    }
    else
        LocFunction = LocTemplates;

//--- Auto Locate Channels - F1 Key or (Menu Switch to Locate) ------//
    if (SelectedActive() >= MAX_SCREEN)
    {
        SortChannels(ActiveTmplNo);
        LoadActive(0,7,0);
        if (ActiveList[0].Status & VALID_SLOT)
            ActiveList[0].Selected = SELECTED;
    } if (ActiveList[0].Status & VALID_SLOT)
    {
        (*LocFunction)();
        if (ChannelCount(ActiveTmplNo) > 0)
            LocHeader(ActiveList[SelectedActive()].SlotNo);
        else
            DisplayDefaults();
        HLActive(SelectedActive());

//--- Removed to disable Scanning/Tracking in Locate Menu ------------------//
//          if (CollectData && !(CollectData & HALTED))
//              SetCollection();

} // End if good first entry //
    else
        DisplayDefaults();

if (GetChecksum() != PCChecksum)
        StatusMsg(" Unit Calibration Required!",ALARM,NULL);

} // End add new channel to linked list //

/*================================================================*\
|       Display Main Menu Graphics to LCD display.                 |
\*================================================================*/ indirect xmem void   GrLocate(void)

{
        //--- Added to disable Scanning/Tracking while in Locate Menu -------//
        HaltCollection();
    ResetHistory();
    DataCollection = NoCollection;

Graph(0,92,239,36,15,81,147,207);
        Draw_Line(0,20,239,20,1);
        PlusMinus[0] = 106;
        PlusMinus[1] = 97;
        PlusMinus[3] = 7;
        Map_Bit_Pattern ((int *) PlusMinus, Plus_Minus, 1);
        HighLightBar[2] = 13;
        HighLightBar[3] = 9;
        AutoLocate();

} // End draw menu screen on LCD //
```

−37−

What is claimed is:

1. Apparatus for analyzing an optical signal having a path and a plurality of wavelength portions, the apparatus comprising:

filter means positionable in the path of the optical signal, said filter means being adjustable to permit first selected ones of the plurality of wavelength portions to pass therethrough;

means for stabilizing and adjusting said filter means;

means for controlling said stabilizing and adjusting means, said controlling means being capable of directing said stabilizing and adjusting means to adjust said filter means, such that said filter means permits said first selected ones of the plurality of wavelength portions to pass therethrough; and detecting means positionable in the path of the optical signal, said detecting means being connected to said controlling means and further being capable of measuring an intensity of each of said first selected ones of the plurality of wavelength portions, said controlling means being capable of directing said stabilizing and adjusting means, in response to said detecting means measuring said intensity of each of said first selected ones of the plurality of wavelength portions, to adjust said filter means to permit second selected ones of the plurality of wavelength portions to pass therethrough.

2. The apparatus according to claim 1, wherein said filter means comprises an etalon filter having first and second laterally spaced apart plates, an air gap intermediate said first and second plates, first and second laterally spaced apart conductive material portions, each of said first and second plates having one of said conductive material portions associated therewith, and means for selectively varying a width of said air gap.

3. The apparatus according to claim 2, further comprising feedback loop means connecting said selectively varying means and said first and second conductive material portions to said stabilizing and adjusting means.

4. The apparatus according to claim 3, wherein said controlling means includes program means for selecting said first and second selected ones of the plurality of wavelength portions.

5. The apparatus according to claim 4, wherein said stabilizing and adjusting means is adapted for measuring wavelengths of said first selected wavelength portions permitted to pass through said filter means, said stabilizing and adjusting means transmits said wavelength measurements to said controlling means, and said controlling means directs said stabilizing and adjusting means in response to said wavelength measurements transmitted to said controlling means from said stabilizing and adjusting means.

6. A method of measuring a first optical carrier having a wavelength, said first optical carrier being included in an optical spectrum, the method comprising the steps of:

providing a filter capable of sampling selected portions of the optical spectrum at corresponding center wavelengths of the selected portions;

adjusting said filter to acquire a first plurality of intensity measurements by sampling the optical spectrum at corresponding first center wavelengths, said first center wavelengths being spaced apart from each other by a first wavelength interval;

comparing each of said first plurality of intensity measurements to adjacent ones of said first plurality of intensity measurements;

selecting one of said first center wavelengths having a corresponding first intensity measurement greater than said adjacent ones of said first plurality of intensity measurements;

adjusting said filter to acquire a second plurality of intensity measurements by sampling the optical spectrum at corresponding second center wavelengths intermediate said one of said first center wavelengths and said corresponding first center wavelengths of said adjacent ones of said first plurality of intensity measurements, said second center wavelengths being spaced apart from said one of said first center wavelengths by a second wavelength interval less than said first wavelength interval;

selecting one of said second center wavelengths having a corresponding second intensity measurement greater than the others of said second plurality of intensity measurements; and adjusting said filter to acquire a third plurality of intensity measurements by sampling the optical spectrum at corresponding third center wavelengths from said one of said second center wavelengths to said one of said first center wavelengths, said third center wavelengths being spaced apart from each other by a third wavelength interval less than said second wavelength interval.

7. The method according to claim 6, wherein said selecting one of said first center wavelengths step further comprises the steps of:

setting a threshold intensity level less than said corresponding first intensity measurement of said one of said first center wavelengths;

comparing said adjacent ones of said first plurality of intensity measurements to said threshold intensity level; and selecting another one of said first center wavelengths having a corresponding first intensity measurement greater than said first plurality of intensity measurements corresponding to said first center wavelengths adjacent said another one of said first center wavelengths when said threshold intensity level is less than selected ones of said adjacent ones of said first plurality of intensity measurements.

8. The method according to claim 7, wherein said threshold intensity level setting step further comprises setting said threshold intensity level at approximately eighty percent of said corresponding first intensity measurement of said one of said first center wavelengths.

9. The method according to claim 6, wherein said filter adjusting step to acquire said second plurality of intensity measurements further comprises adjusting said filter to acquire said second plurality of intensity measurements, such that two of said second plurality of intensity measurements are acquired, each of said corresponding second center wavelengths being spaced apart from said one of said first center wavelengths by said second wavelength interval, said second wavelength interval being less than said first wavelength interval and further being greater than one-half of said first wavelength interval.

10. The method according to claim 6, further comprising the steps of:

selecting one of said third center wavelengths having a corresponding third intensity measurement greater than the others of said third plurality of intensity measurements;

adjusting said filter to acquire a fourth plurality of intensity measurements by sampling the optical spectrum at corresponding fourth center wavelengths from said one of said third center wavelengths to third center wavelengths adjacent said one of said third center wavelengths; and identifying the corresponding center wavelength of the greater one of said fourth plurality of intensity measurements as the wavelength of the first optical carrier.

11. The method according to claim 10, wherein said filter providing step further comprises providing said filter having a wavelength resolution, and wherein said filter adjusting step to acquire said fourth plurality of intensity measurement samples further comprises sampling the optical spectrum at said corresponding fourth center wavelengths, said fourth center wavelengths being spaced apart from each other by a fourth wavelength interval approximately equal to said wavelength resolution of said filter.

12. The method according to claim 10, wherein the optical spectrum includes a second optical carrier having a wavelength, wherein said filter providing step further comprises providing said filter having a filter profile, and further comprising the steps of:

calculating a contribution to said greater one of said fourth plurality of intensity measurements of an intensity of the second optical carrier by determining an intersection of said filter profile at said corresponding center wavelength of said greater one of said fourth plurality of intensity measurements with said second optical carrier wavelength; and subtracting said contribution to said greater one of said fourth plurality of intensity measurements from said greater one of said fourth plurality of intensity measurements to determine an intensity of the first optical carrier.

13. The method according to claim 12, wherein the optical spectrum includes optical noise associated with the first optical carrier, and further comprising the steps of:

adjusting said filter to acquire a plurality of noise intensity measurements by sampling the optical spectrum at corresponding noise center wavelengths, each of said noise center wavelengths being spaced apart from the first optical carrier wavelength;

calculating a contribution to each of said noise intensity measurements by determining an intersection of said filter profile at each of said noise center wavelengths with said second optical carrier wavelength;

subtracting each of said contributions to each of said noise intensity measurements from the corresponding one of said noise intensity measurements to determine a plurality of corrected noise intensity measurements;

adding said plurality of corrected noise intensity measurements together and dividing by the number of said plurality of corrected noise intensity measurements to produce an average noise intensity measurement; and subtracting said average noise intensity measurement from said intensity of the first optical carrier to determine a signal intensity of the first optical carrier.

14. The method according to claim 13, wherein said step of providing said filter further comprises providing said filter having a calibration factor associated with said filter profile, and further comprising the steps of:

multiplying said calibration factor by said average noise intensity measurement to determine a corrected average noise intensity measurement; and multiplying said calibration factor by said signal intensity of the first optical carrier to determine a corrected signal intensity of the first optical carrier.

15. The method according to claim 14, further comprising the step of:

dividing said corrected signal intensity of the first optical carrier by said corrected average noise intensity measurement to determine a signal-to-noise ratio of the first optical carrier.

16. A method of analyzing a plurality of optical carriers within an optical spectrum, each of the plurality of optical carriers having a signal intensity portion and a wavelength, and the optical spectrum having a total intensity, the method comprising the steps of:

measuring the total intensity of the optical spectrum at a first series of spaced apart wavelengths to thereby produce a corresponding first series of intensity measurements; and measuring the total intensity of the optical spectrum at a second series of spaced apart wavelengths to thereby produce a corresponding second series of intensity measurements, said second series of spaced apart wavelengths being taken over a first wavelength range of the optical spectrum from a first one of said first series of wavelengths to a second one of said first series of wavelengths, a third one of said first series of wavelengths being intermediate said first and second ones of said first series of wavelengths and having a corresponding intensity measurement greater than corresponding intensity measurements of said first one and said second one of said first series of wavelengths.

17. The method according to claim 16, wherein said step of measuring the total intensity of the optical spectrum at said second series of spaced apart wavelengths further comprises measuring the total intensity of the optical spectrum at said second series of spaced apart wavelengths wherein said third one of said first series of wavelengths has a corresponding intensity measurement approximately twenty percent greater than corresponding intensity measurements of said first one and said second one of said first series of wavelengths.

18. The method according to claim 16, further comprising the steps of:

identifying one of said second series of wavelengths having a corresponding intensity measurement greater than each corresponding intensity measurement of the others of said second series of wavelengths; and measuring the total intensity of the optical spectrum at a third series of spaced apart wavelengths to thereby produce a corresponding third series of intensity measurements, said third series of spaced apart wavelengths being taken over a second wavelength range of the optical spectrum from said one of said second series of wavelengths to said third one of said first series of wavelengths.

19. The method according to claim 18, further comprising the steps of:

providing means for measuring the total intensity of the optical spectrum, said measuring means having a wavelength resolution;

identifying one of said third series of wavelengths having a corresponding intensity measurement greater than each corresponding intensity measurement of the others of said third series of wavelengths; and directing said measuring means to measure the total intensity of the optical spectrum at fifth and sixth wavelengths of said optical spectrum, said fifth and sixth wavelengths being spaced apart from said one of said third series of wavelengths by said measuring means wavelength resolution, said fifth wavelength being less than said one of said third series of wavelengths, and said sixth wavelength being greater than said one of said third series of wavelengths, each of said fifth and sixth wavelengths having a corresponding intensity measurement.

20. The method according to claim 19, further comprising the steps of:

identifying the wavelength of one of the optical carriers as one of said one of said third series of wavelengths and said fifth and sixth wavelengths having a corresponding intensity measurement greater than the corresponding intensity measurement of the others of said one of said third series of wavelengths and said fifth and sixth wavelengths;

measuring the contribution from the others of the optical carriers to the corresponding intensity measurement of the one of the optical carriers; and subtracting the contribution from the others of the optical carriers from the corresponding intensity measurement of the one of the optical carriers to thereby determine the signal intensity portion of the one of the optical carriers.

* * * * *